United States Patent
Mestanov et al.

(10) Patent No.: US 9,860,775 B2
(45) Date of Patent: Jan. 2, 2018

(54) NETWORK BASED DETERMINATION OF WHETHER TO ADD A DEVICE TO A SYSTEM USING CSMA

(71) Applicant: Telefonaktiebolaget L M Ericsson (publ), Stockholm (SE)

(72) Inventors: Filip Mestanov, Sollentuna (SE); Oscar Zee, Stockholm (SE); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 98 days.

(21) Appl. No.: 14/894,530

(22) PCT Filed: May 27, 2014

(86) PCT No.: PCT/EP2014/060968
§ 371 (c)(1),
(2) Date: Nov. 29, 2015

(87) PCT Pub. No.: WO2014/191416
PCT Pub. Date: Dec. 4, 2014

(65) Prior Publication Data
US 2016/0119801 A1     Apr. 28, 2016

(30) Foreign Application Priority Data
May 31, 2013   (EP) .................... 13170038

(51) Int. Cl.
*H04W 84/06*     (2009.01)
*H04W 36/14*     (2009.01)
(Continued)

(52) U.S. Cl.
CPC .......... *H04W 24/06* (2013.01); *H04W 36/14* (2013.01); *H04W 48/06* (2013.01); *H04W 48/16* (2013.01);
(Continued)

(58) Field of Classification Search
None
See application file for complete search history.

(56) References Cited

U.S. PATENT DOCUMENTS

2002/0102986 A1* 8/2002 Iwamura ............... H04W 48/06
455/453
2004/0213153 A1* 10/2004 Nagato ................. H04Q 11/04
370/230

(Continued)

FOREIGN PATENT DOCUMENTS

EP    1715637 A1   10/2006
WO    20120162284 A1   11/2012

OTHER PUBLICATIONS

PCT International Search Report, dated Jul. 24, 2014, in connection with International Application No. PCT/EP2014/060968, all pages.

(Continued)

*Primary Examiner* — Chi H Pham
*Assistant Examiner* — Soon-Dong D Hyun
(74) *Attorney, Agent, or Firm* — Leffler Intellectual Property Law, PLLC

(57) ABSTRACT

The present disclosure relates to wireless networks, and more specifically to multiple access networks. The present disclosure relates to methods implemented by a wireless network node, to which a number of wireless devices are already connected of determining admission of a further wireless device. The disclosure provides for a method implemented by a wireless network node, to which a number of wireless devices are already connected and are communicating using an access method, of determining admission of a further wireless device. The method comprises calculating a measure of the performance of a possible future connection between the wireless network node and the wireless device under ideal network condition estimating an expected performance of a possible future connection between the (Continued)

wireless network node and the further wireless device, as the calculated measure of the performance while taking into account effects of the used access method; and determining admission of the further wireless device based on the estimated expected performance. It further relates to a wireless network node configured to perform the methods.

12 Claims, 8 Drawing Sheets

(51) Int. Cl.
      *H04W 48/16*       (2009.01)
      *H04W 48/18*       (2009.01)
      *H04W 74/08*       (2009.01)
      *H04W 76/02*       (2009.01)
      *H04W 24/06*       (2009.01)
      *H04W 48/06*       (2009.01)

(52) U.S. Cl.
      CPC ....... *H04W 48/18* (2013.01); *H04W 74/0808* (2013.01); *H04W 76/02* (2013.01)

(56) References Cited

U.S. PATENT DOCUMENTS

| | | | |
|---|---|---|---|
| 2006/0067270 A1* | 3/2006 | Gilliland | H04W 28/18 370/329 |
| 2006/0092963 A1 | 5/2006 | Bakre et al. | |
| 2007/0070902 A1 | 3/2007 | Elaoud et al. | |
| 2007/0097862 A1* | 5/2007 | Moon | H04L 12/5695 370/230 |
| 2007/0135133 A1* | 6/2007 | Ishii | H04W 72/10 455/453 |
| 2008/0146240 A1 | 6/2008 | Trudeau | |

OTHER PUBLICATIONS

PCT Written Opinion, dated Jul. 24, 2014, in connection with International Application No. PCT/EP2014/060968, all pages.

European Search Report, dated Nov. 26, 2013, in connection with European Application No. 13170038.7, all pages.

Pong D et al., Call admission control for IEEE 802.11 contention access mechanism, IEEE Global Telecommunications Conference, Conference Proceedings, San Francisco, CA, USA, Dec. 1-5, 2003, [IEEE Global Telecommunications Conference], New York, NY, US, vol. 1, Dec. 1, 2003, pp. 174-178.

Jian Ye et al., A Comprehensive Resource Management Framework for Next Generation Wireless Networks, IEEE Transactions on Mobile Computing, vol. 1, No. 4, Oct.-Dec. 2002, pp. 249-264.

Elias Z. Tragos et al., Admission Control for QoS Support in Heterogeneous 4G Wireless Networks, IEEE Network, May 1, 2008, IEEE Service Center, New York, NY, US, 22, 3, pp. 30-37.

Qingyang Song et al., A quality of service negotiation-based vertical handoff decision scheme in heterogeneous wireless systems, European Journal of Operational Research, Dec. 16, 2008, Amsterdam, NL, 191, 3, pp. 1059-1074.

\* cited by examiner

S2
Estimating an expected performance of a possible future connection with the further wireless device, while taking into account effects of the used modulation scheme

| (S2a) based on the number of already devices connected | (S2b) based on estimating one or several of; time to clear channel, interference and collision rate | (S2c) based on the present channel load |

FIG. 5

NETWORK BASED DETERMINATION OF WHETHER TO ADD A DEVICE TO A SYSTEM USING CSMA

CROSS-REFERENCE TO RELATED APPLICATIONS

This application claims priority under 35 U.S.C. §119 to European Patent Application No. 13170038.7, filed May 31, 2013, which is hereby incorporated herein by reference in its entirety.

TECHNICAL FIELD

The present disclosure relates to wireless networks, and more specifically to multiple access networks. The present disclosure relates to methods implemented by a wireless network node, to which a number of wireless devices are already connected, of determining admission of a further wireless device. It further relates to a wireless network node configured to perform the methods.

BACKGROUND

Today wireless devices, such as mobile phones, typically support other wireless technologies such as Wireless Local Area Networks (WLANs), commonly referred to as Wi-Fi, in addition to the cellular standards. As a means to improve the network capacity in future networks, Wi-Fi is intended to be an integral part. That is, Wi-Fi will be regarded as just another radio access technology, so that a connection or handover can be made to Wi-Fi without the user noticing that the service is no longer being carried by 3GPP technologies like WCDMA or LTE.

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

Presently handover between a network using 3GPP technologies and a Wi-Fi network is controlled by the wireless device. This is due to that the Wi-Fi network is still not sufficiently tightly integrated with the cellular networks using 3GPP technologies. However, using Wi-Fi is from a user perspective often preferred, because of the lower cost associated with it. Therefore, a handover is often performed to Wi-Fi as soon as a Wi-Fi network is detected and the signal strength is sufficiently high. Hence, when a wireless device is in range of a Wi-Fi network it will typically connect to this wireless network when the received signal strength indication, RSSI, is sufficiently high, without further analysis.

There are also prior art solutions where an access point gives admission to a device in connection with a handover between cells. As an example, published patent application US2008146240 discloses call admission control providing a method for use in wireless local area network, involving determining whether an access point has sufficient unused bandwidth to handle additional call in response to call admission control request.

Another example of known technique is "A comprehensive resource management framework for next generation wireless networks", by Jian Ye; Jiongkuan Hou; Papavassiliou S, IEEE TRANSACTIONS ON MOBILE COMPUTING, 2002, Vol. 1, No. 4, pp. 249-264, which is disclosing a method for comprehensive resource management framework in the next generation wireless networks. The document introduces a combined resource management and call admission control scheme which simultaneously considers user mobility and user service type. This solution, takes into account several other functions when performing the admission control, such as probability of an incoming call from an already connected idle wireless device, probability of an incoming HO, etc. This solution is suitable for admission to a wireless network node in a cellular network, where wireless devices are moving between cells.

However, a Wi-Fi network is not necessarily affected by the mobility of devices. The Wi-Fi network often operates as a complement to the cellular network, for offloading traffic in busy areas.

Furthermore, the actual performance which can be supported by a Wi-Fi network might be poor although the predicted performance is high. One example is that the received signal has a very high strength/level and/or quality, but that the data rate that a wireless device gets once connected to the Wi-Fi network is very low. This leaves a high amount of uncertainty to the users, because the Signal Strength Indicator, which is typically displayed in the user interface of the device, will then not correspond to the actual performance. When the wireless device connects or performs handover to Wi-Fi networks which cannot provide a required performance, users of the wireless devices tend to completely turn off Wi-Fi, which of course overturns the idea of Wi-Fi as a means to improve the performance.

SUMMARY

The basic concept of the disclosure is to monitor present traffic conditions to obtain additional information concerning the load of an access point (AP) before deciding to associate a new wireless device. This might be relevant if there are too many wireless devices which have high signal strength from the access point or wireless network node and therefore choose to connect to this particular wireless network node. Additionally, the techniques of the present disclosure avoid the situation when the channel is shared by means of Carrier Sense Multiple Access/Collision Avoidance (CSMA/CA), which might otherwise result in that only a very low data rate can be supported to a particular wireless device, although the signal strength is very high.

According to one aspect of the disclosure, it provides for a method implemented by a wireless network node, to which a number of wireless devices are already connected and are communicating using an access method, of determining admission of a further wireless device. The method comprises calculating a measure of the performance of a possible future connection between the wireless network node and the wireless device under ideal network conditions, estimating an expected performance of a possible future connection between the wireless network node and the further wireless device, as the calculated measure of the performance while taking into account effects of the used access method; and determining admission of the further wireless device based on the estimated expected performance. Such a solution allows for better user experience, because the wireless network node will consider expected performance when giving admission to new devices. This typically implies giving admission to new devices only if performance is above a certain level, which may e.g. be determined based on requirements of the new or further wireless device.

According to one aspect, the estimation of an expected performance is based at least in part on the number of wireless devices already connected to the wireless network node. By basing the estimation on the number of wireless devices already connected to the wireless network the risk of collision is taken into account.

According to one aspect, the estimation of an expected performance is further based on the activity of the already connected wireless devices. This gives a more accurate estimate, because only active wireless devices have a significant effect on the performance.

According to one aspect, performance is assumed to decrease linearly compared to the ideal case, as a function of the total number of wireless devices connected to the wireless network node. According to one aspect the decrease is assumed to be zero up to a predefined number of connected devices. By making simple assumptions, the estimation may be done in an easy way.

According to one aspect, the step of determining admission of the further wireless device is further based on required performance or priority requirement of the further wireless device.

According to one aspect, the step of calculating a measure of the performance of a possible future connection and the step of estimating an expected performance of a possible future connection are executed as a joint operation.

According to one aspect, the further wireless device is already connected to another wireless network and a connection of the further wireless device to the wireless network node implies a handover to the wireless network node. Then the decision to handover to the wireless network is further based on connection characteristics of the connection between the further wireless device and the other wireless network, to which the further wireless device is already connected.

According to one aspect the disclosure relates to a computer program, comprising computer readable code which, when run on a wireless network node in a cellular communication system, causes the node to perform the method as described above.

According to another aspect, the disclosure relates to a wireless network node. The wireless network node comprises a network communicator configured to communicate with a number of wireless devices, a calculator configured to calculate a measure of the performance of a possible future connection between the wireless network node and a further wireless device under ideal network conditions an estimator configured to estimate an expected performance of a possible future connection between the wireless network node and the further wireless device, as the calculated measure of the performance while taking into account effects of the used access method and a determiner configured to determine on admission of the further wireless device based on the estimated expected performance.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which:

FIG. 5 is a flow chart illustrating the step of estimating an expected performance in further detail.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The basic concept of this disclosure is to provide a mechanism for performance estimation that an access point, also referred to as wireless network node, can use in order to decide whether or not to accept a connection request from a particular wireless device. The performance estimation is e.g. based on radio link and load conditions, as well as other factors. The performance estimation algorithm is an algorithm that enables the wireless network node to estimate or predict the performance, e.g. the potential bit rate or transmission delay or delay jitter for a connecting wireless device, prior to the connection actually been established.

The present technique is based on the presumption that many times there are effects of the access protocol used for accessing a shared channel, which result in that only a very low data rate can be supported to a particular wireless device, although the signal strength is very high. For example, in a CSMA/CA, Carrier Sense Multiple Access/Collision Avoidance, system having many devices connected to the same wireless network node increases the risk of collision, interference and time to idle channel assessment, i.e. an idle channel between devices. The Clear Channel Assessment (CCA) is a function that resides in both the STA and the AP and estimates the channel state. The channel state can be either BUSY or IDLE, so even though the function is called "clear" channel assessment, a "clean" channel is in IDLE state.

This situation is different from the above mentioned prior art solutions, where a network node determines on admission of a wireless device, based on the free capacity or probability that the wireless network node in the future might not be able to provide the required performance because either a device in idle mode becomes active or that an active device moves to this wireless network node.

Figure 1:
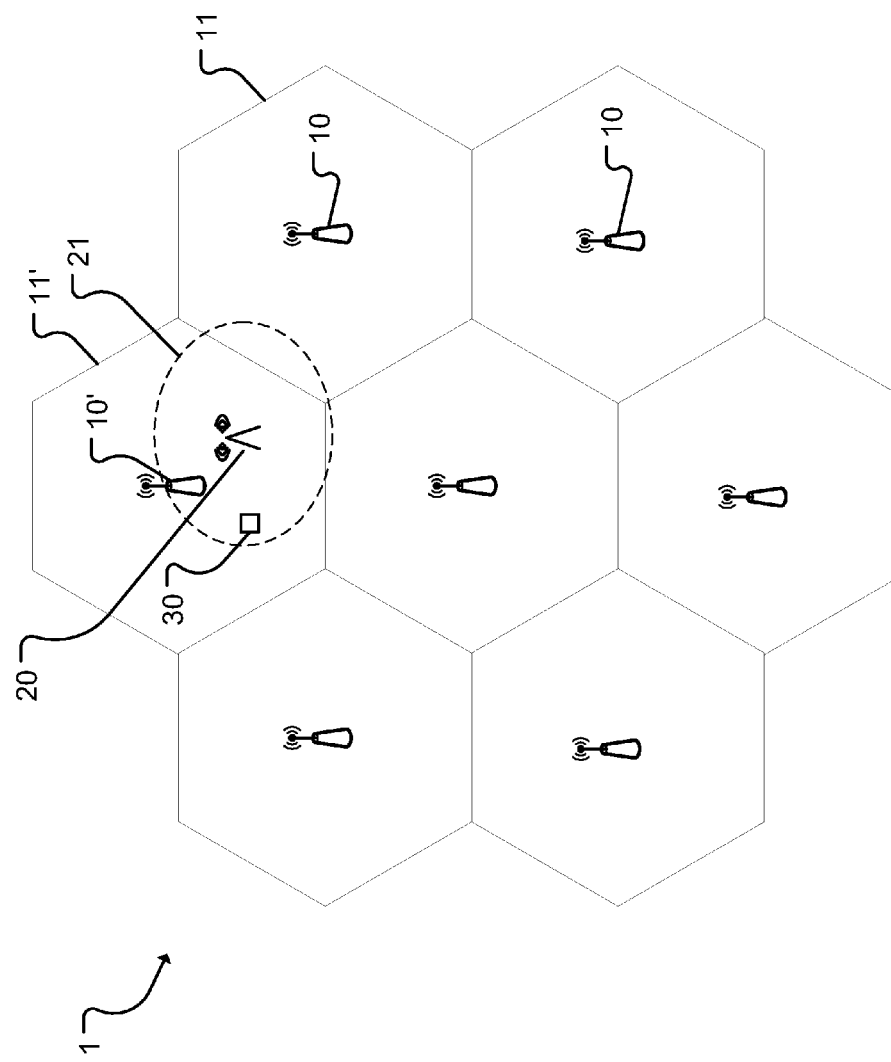
FIG. 1 illustrates a cellular network and a local area network.

A situation where the proposed technique is applicable, will now be described starting at FIG. 1 illustrating a cellular network 1 comprising a number of base stations 10, each defining a corresponding cell 11. The cellular network is e.g. a GSM, UMTS or LTE network.

In the example disclosed in FIG. 1, a further wireless network 21, here a local area network 21, is placed within the coverage of the cellular network 1. The wireless network may be owned by the operator of the cellular network 1 or may be privately operated and owned. The local area network 21 is defined by a wireless network node (or access point) 20. The local area network 21 is a packet switched wireless network, e.g. a Wi-Fi network.

In this example a wireless device 30 is connected to the cellular network 1 via a base station 10'. The wireless device 30 is positioned within the cell 11' defined by the base station 10'. The wireless device 30 is also within the range of the local area network 21 having a wireless network node 20.

Figure 2:
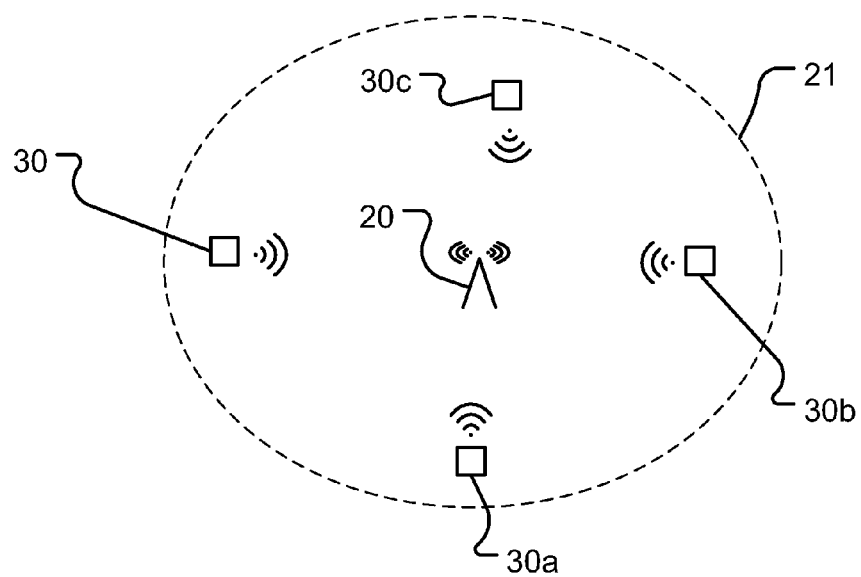
FIG. 2 illustrates a cell comprising a wireless network node.

FIG. 2 illustrates the wireless network 21 in further detail. Three devices 30a-30c are already connected to the wireless network node 20. The resources of the wireless network node 20 are shared among the wireless devices 30a-30c connected to the network. Wi-Fi networks use CSMA/CA, Carrier Sense Multiple Access/Collision Avoidance to ensure that only one network node is transmitting at any given time. According to the proposed technique, the wireless network 21 determines whether to approve admission of a further wireless device 30. The principle for determining admission will be further described below.

When the channel is shared by means of Carrier Sense Multiple Access/Collision Avoidance (CSMA/CA), the principle of Carrier Sense implies that every wireless device listens to the channel before it attempts to transmit. If the wireless device senses that another device is transmitting, it will wait to transmit. Collision Avoidance means that if the channel is sensed as busy, the wireless device or station, STA, defers its transmission. Ideally this will ensure that no collisions occur. However, there is a small chance that two or more devices sense the channel as being idle and therefore start to transmit. When a packet is lost in this way, it is assumed that a collision has taken place and each node waits a random amount of time before transmitting again.

As an example of how the access method affects performance, a simulation in a CSMA/CA network will now be described. Collisions are normal on a CSMA/CA network. A small amount of collisions are expected in the protocol design. However, if too many devices or nodes are transmitting on a CSMA/CA network, the number of collisions can rise to an unacceptable level. This can reduce the amount of available bandwidth on a network because part of the bandwidth is lost as it is needed in retransmission.

FIGS. 3a-3d show simulations that have been performed for a Wi-Fi network, to investigate how performance parameters are affected by the number of wireless devices or stations, STAs, attached to a wireless network node or access point (AP). In the simulations the effect of the total load of a wireless network has also been investigated. In these simulations performance has been estimated by looking at how bit rate and transmission delay vary dependent on the number of wireless devices attached and the total load.

What is simulated is performance at one wireless network node or access point, AP, with a varying number of wireless devices or stations, here denoted STAs, being connected. The total supported data rate of a wireless network node or AP depends on the situation and is affected e.g. by the number of connected devices. In these simulations the total supported data rate has turned out to be about 25 Mbps. In this example, STA1 is the new device that is a candidate for being connected to the network. In the example shown in FIGS. 3a and 3b, the total load of the already connected devices (STA2 up to STA N) is 12.5 Mbps in uplink and 12.5 Mbps in downlink. Hence, the channel utilization is in this case essentially 100%. In this example the requested data rate of STA1 is 1 Mbps for both uplink and downlink. The simulation is made for Transmission Control Protocol, TCP, traffic with packets of 1500 Bytes. The downlink destination is chosen based on Round Robin scheduler, when the wireless network node accesses the channel. No priority is given to the wireless network node. Hence, the share of the wireless network node is equal to the share of each wireless device i.e. 25/(N+2) Mbps.

Figure 3A:
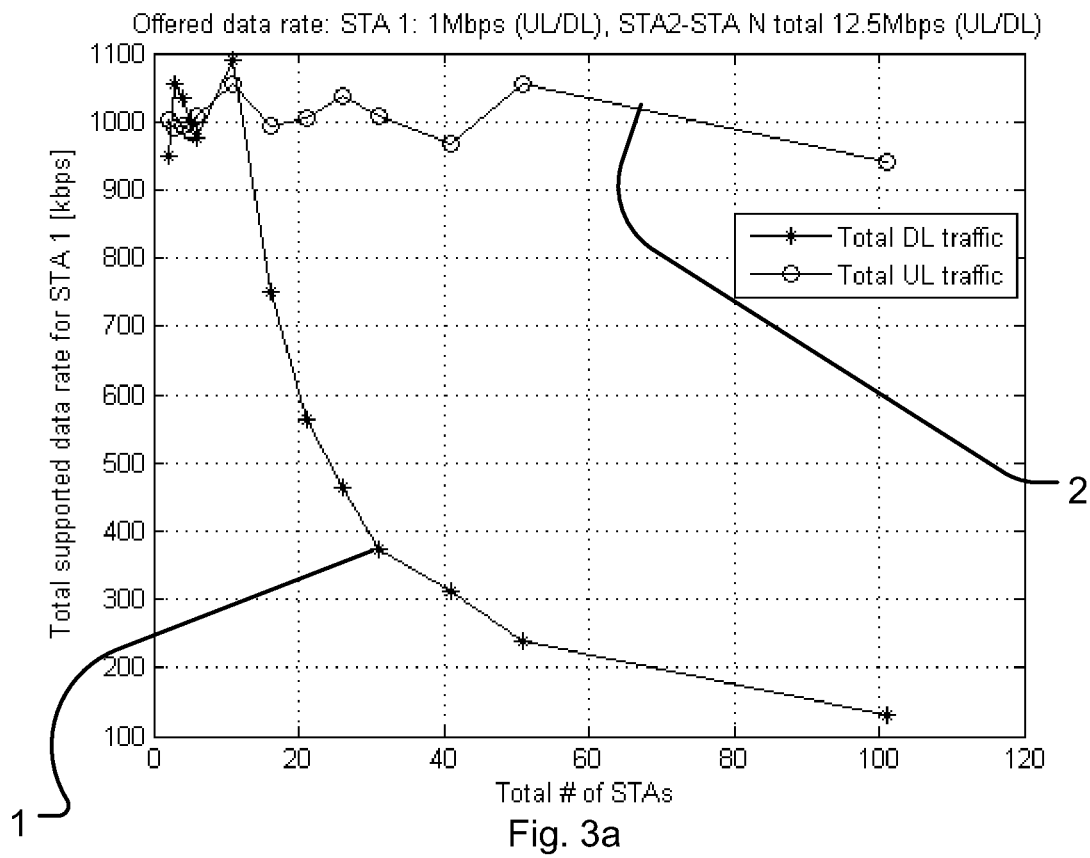
FIGS. 3a to 3d show simulations performed in a Wi-Fi network.
Figure 3B:
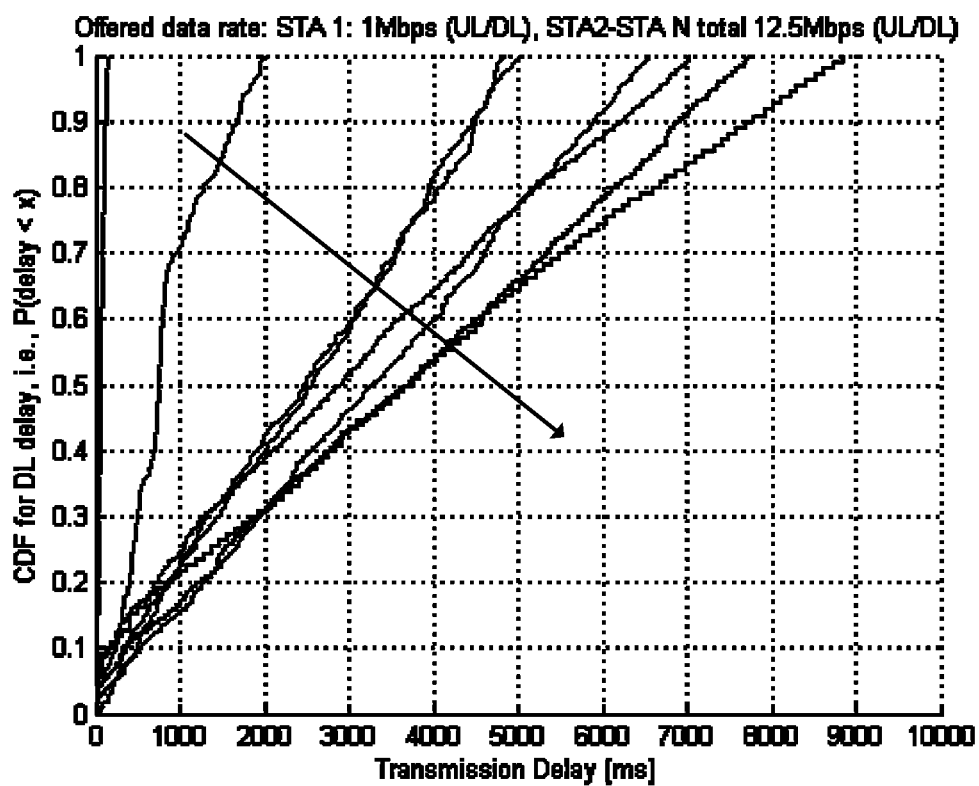
Figure 3C:
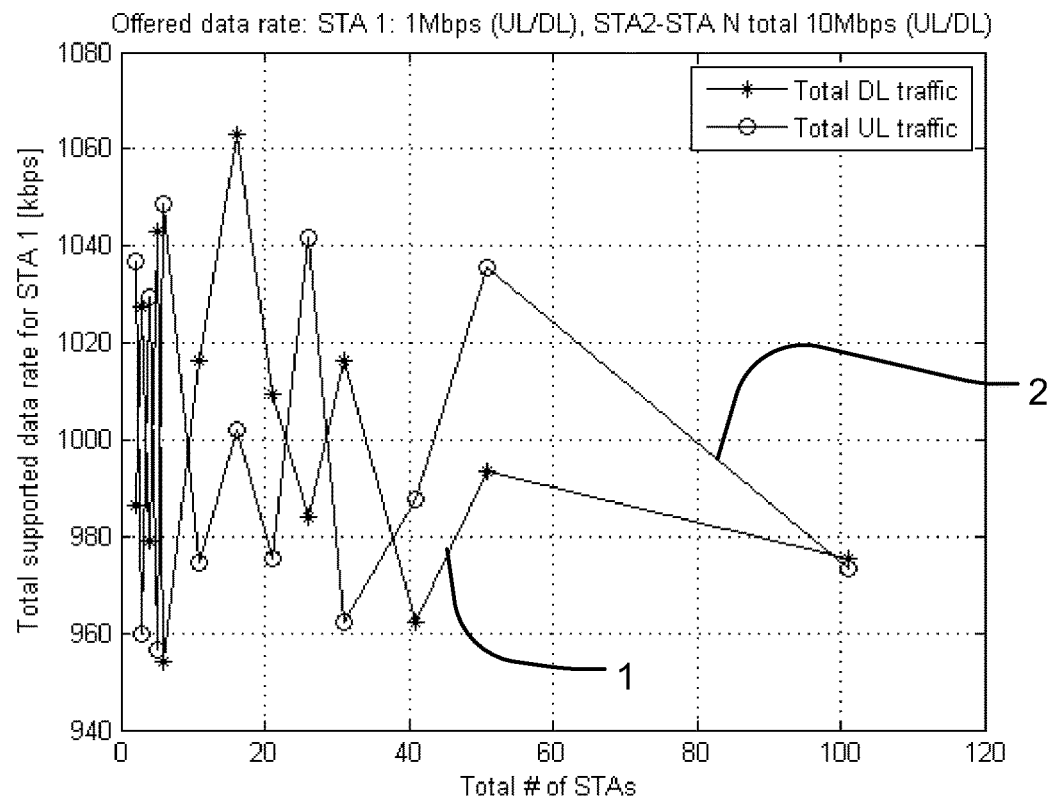

In FIGS. 3a and 3c the y-axis represents the total supported data rate, as the measure of the performance, for STA1 and the x-axis represents the number devices connected to the wireless network node (Total # of wireless devices). FIG. 3a shows how the supported downlink data rate 1 for STA1 (y-axis) decreases with the number of wireless devices connected to the wireless network node (Total # of STAs, x-axis). The reason is that the share for the downlink decreases with the number of connected devices or stations. However, because there is not data present for all N+1 STAs at all times, the decrease will not be proportional to the number of wireless devices.

In contrast, in these simulations the supported uplink data rate 2 is not visibly affected by an increased number of wireless devices. The reason is that STA2-STA N do not transmit its full bit rate at all times, which implies that STA1 will be offered more than its share even in the case of many already connected devices. If priority would be given to the downlink, then UL and DL would be more equally affected by the increase in the number of wireless devices.

Correspondingly, FIG. 3b shows how the Cumulative Distribution Function, CDF, for the measure of the performance being UL and DL transmission delays, relate to the number of wireless devices. In FIG. 3b the x-axis represents the delay and the y-axis represents the CDF. Each line corresponds to a number N of previously connected devices. FIG. 3b shows that the CDF moves towards longer transmission delays when the number of connected devices N is increased as illustrated by the arrow.

Figure 3D:
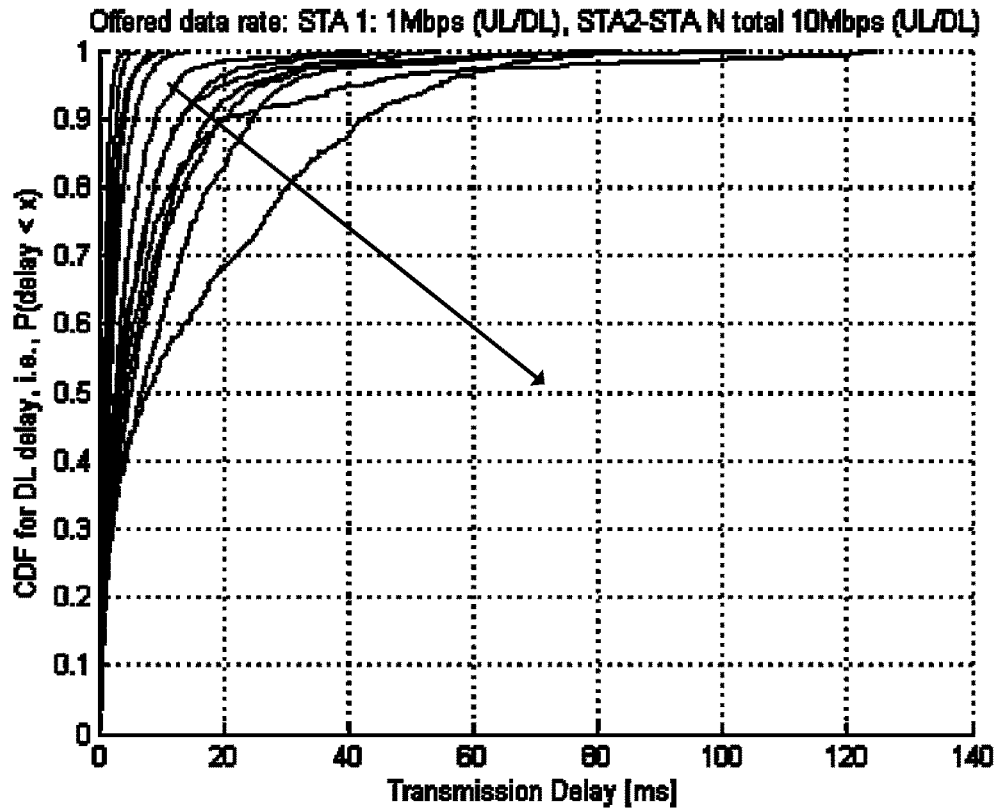

A further example is shown in FIGS. 3c and 3d. In this example the prerequisites are the same, except that the load of the previously connected devices is 10 Mbps in uplink and 10 Mbps in downlink. Hence, the channel utilization is around 80% on average. FIG. 3c shows that when the network load is not 100%, the effect of the number of stations on the supported downlink data rate 1 is less than in the example where the network load is close to 100%. A similar effect is visible regarding the transmission delay shown in FIG. 3d, which is less affected by the number of stations, than in the example of FIG. 3b. The general conclusion is that high traffic is problematic with several connected devices and full load of the wireless network node.

Embodiments of the present disclosure relate, in general, to connecting to a local area network using CSMA/CA. However, it must be appreciated that the same principle may be implemented in any wireless network.

In this application the term wireless device is generally used. A wireless device, or user equipment, UE, which is the term used in the 3GPP specifications, referred to in this application could be any wireless device capable of communicating with a wireless network. Examples of such devices are mobile phones, Smartphones, laptops and Machine to Machine, M2M, devices etc. However, one must appreciate that capability to communicate with a wireless network could be built in almost any device e.g. a car, a lamp post, a scale and so on.

A wireless network node in this disclosure refers to an access point, AP, in a wireless network that transmits and receives data. The wireless network node connects devices to other devices within the network and also can serve as the point of interconnection between the network and a fixed wire network or another wireless network. Each wireless network node can serve multiple devices within a defined network area or range. A small Wi-Fi network may only require a single wireless network node. However, the number required increases as a function of the number of network devices or users and the physical size of the network.

The method of determining admission of a further wireless device to a wireless network node, to which a number of wireless devices are already connected and are communicating, will now be described referring to FIG. 4 in combination with FIGS. 1 and 2. According to one aspect of the disclosure, it provides for a method implemented by a wireless network node, to which a number of wireless devices are already connected and are communicating using an access method, of determining admission of a further wireless device. According to one aspect the wireless network node is an Access Point in a Wireless Local Area Network and where the wireless devices are Stations in the same system.

In the first step S1, the wireless network node calculates a measure of the performance of a possible future connection between the wireless network node and the wireless device under ideal network conditions. Ideal conditions here refers to that the available data rate is divided between the connected devices, without any external effects such as interference, or collisions between the connected devices. Furthermore, it is assumed that both the connected devices and possible future connected device will have full buffer traffic. This means that the wireless network node assumes that all available Time will be allocated to the further wireless device.

The wireless network node e.g. a Wi-Fi access point, typically transmits beacon frames at regular intervals to announce the existence of the wireless network. The expected bit rate, which a wireless device can obtain upon connecting to the wireless network node, can then according to one example be expressed as:

$$ExpectedBitrate = \frac{TCPPacketSize * NumberOfTCPCycles}{BeaconPeriodTime * NumberOfTCPPDUPerATCPPDU},$$

where NumberOfTCPCycles is the number of TCP Cycles per beacon period, TCPPacketSize is the size of the payload of one TCP packet and wherein BeaconPeriodTime is the period time of the beacon period, i.e. the interval by which beacons are transmitted and NumberOfTCPPDUPerATCPPDU is a parameter which is 1 if the device doesn't support frame aggregation i.e. Aggregation MAC Protocol Data Unit, A-MPDU, and which depends on the modulation and coding scheme (MCS) and the TCP packet size if frame aggregation is supported.

In the next step S2, the wireless network node estimates an expected performance of a possible future connection between the wireless network node and the further wireless device, as the calculated measure of the performance while taking into account effects of the used access method. Examples of effects of the used access method are time to idle channel, interference and collision rate.

Hence, according to one aspect shown in FIG. 5, the estimation of an expected performance is based on S2b estimating one or several of the following measures: time to idle channel, interference and collision rate. This may be done e.g. by assuming that the performance decreases as a function of any parameter affecting the traffic load in the wireless network node. Examples of this will be illustrated by the examples below. Note that the steps of calculating an ideal performance and estimating the predicted performance are not necessarily two independent steps. It may as well be one joint step by one equation, wherein the complete estimation is made. Hence, according to one aspect of the proposed technique, the step of calculating a measure of the performance of a possible future connection and the step of estimating an expected performance of a possible future connection are executed as a joint operation. This implies e.g. defining an equation executing both steps. It may also comprise using a look-up table, which has been generated for instance by simulations beforehand, which is used to estimate the performance, wherein the look-up table corresponds to the step of calculating a measure of the performance of a possible future connection and the step of estimating an expected performance of a possible future connection.

Figure 4:
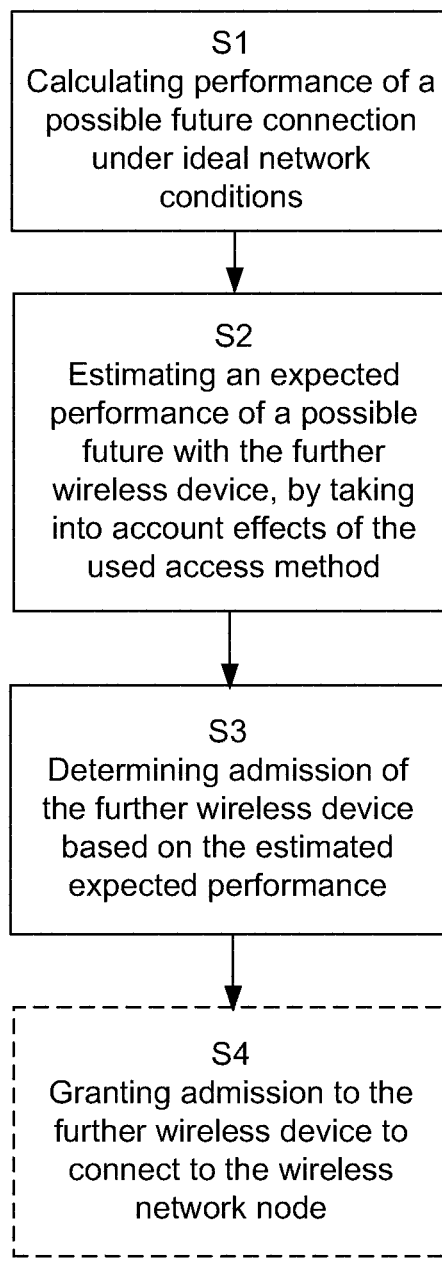
FIG. 4 is a flow chart illustrating a method performed by a wireless network node according to an exemplary embodiment of the present disclosure.

In the final step S3 of FIG. 4 the wireless network node determines admission of the further wireless device based on the estimated expected performance. The determination is e.g. made by comparing the estimated expected performance with e.g. a requirement on bit rate and/or latency of the further wireless device. The present connection, if any, of the further wireless device, may of course also be taken into account. Hence, the situation described above, where too many or interfering wireless devices are simultaneously connected to the network, is avoided.

The following example will illustrate this further. Suppose there is one wireless network node, here denoted AP, and that there are currently N wireless devices associated with this AP, here denoted STA1, STA2, . . . , STA N. Furthermore, suppose that these stations on average have access to the channel for a fraction of the total available time, each fraction is here denoted r_1, r_2, . . . , r_N. To simplify the description and the notation, but without limiting the merits of the disclosure, we do not consider the details of the CSMA/CA protocol, like details for how the contention is done. Instead, we simplify and assume that each wireless device has the same chance to get access to the channel and that the channel is shared in a completely fair way between each wireless device. It is readily seen that if there are many stations that needs to have access to the channel for a relatively large fraction of time, there will only be limited capacity for one particular wireless device. Suppose that the total data rate that can be supported is 20 Mbps but that in the current situation the required combined data rate is only 10 Mbps. Furthermore suppose that N=10. Since also the AP needs to compete for the channel, this means that there will in total be 11 units that have to share the channel. Furthermore, for simplicity, suppose that the uplink and downlink traffic are the same and that all wireless devices get the same data rate. This means that the AP will occupy 25% of the channel time, 2.5% for DL transmission to each one of the wireless device, and each one of the wireless devices will occupy 2.5% for UL transmission to the AP. Recall that only 10 Mbps out of the maximum 20 Mbps was required so that the total channel occupation is 50%.

This disclosure relates to a wireless device or STA, which is within the range of a wireless network node or AP. This wireless device receives a beacon transmitted by the wireless network node (typically every 102.4 ms) and decides to connect to that wireless network node. The wireless network node runs a performance estimation algorithm for that wireless device and takes a decision whether to accept the connection or reject the wireless device. The performance estimation algorithm boils down to an algorithm that enables the wireless network node to predict or estimate the potential performance for a new connecting wireless device, prior to the connection actually being established. The step of calculating a measure of the performance comprises calculating e.g. bit rate, transmission delay, or delay jitter. A performance parameter of interest might be the expected transmission delay. Because of the nature of CSMA, the expected delay will increase when the number of wireless devices is increased. Hence, according to one aspect of this disclosure which is disclosed in FIG. 5, the estimation of an expected performance is based S2a at least in part on the number of wireless devices already connected to the wireless network node.

According to one aspect, the method illustrated in FIG. 4 further comprises granting admission S4 to the further wireless device to connect to the wireless network node. This step is performed after the determination of step S3. Then, the same principle may be applied to the next device requesting to connect to the wireless network node.

According to one aspect, the further wireless device is already connected to another wireless network and a connection of the further wireless device to the wireless network node implies a handover to the wireless network node. Then the decision to grant admission, i.e. to handover to the wireless network is further based on connection characteristics of the connection between the further wireless device and the wireless network, to which the further wireless device is already connected, e.g. a cellular network.

Imagine a wireless device being connected to another wireless network, e.g. the further wireless device is communicating with a base station 10 in the cellular communication system 1. The connection to the local area network 21 may then imply a handover from the cellular communication system to the local area network 21 of the wireless network node, see FIG. 1. In such a situation the status of the connection between the further wireless device and the cellular communication system may of course be taken into account, when determining admission of the further wireless device to the wireless network node, e.g. the AP of the local area network 21. Hence, according to one aspect, the decision to handover to the wireless network is further based on connection characteristics of the connection to the current wireless network. For example, a wireless device that already has a good connection maybe given lower priority. Hence, for a wireless device which already has a connection, the requirement on the new connection may be put in relation to the current connection. According to one aspect, only in case the new potential connection is determined to be preferred over the old connection, a handover is made.

Another parameter being relevant for estimating performance is the percentage of active wireless devices among the wireless devices already connected to the wireless network node. A wireless device is active if it has surpassed a certain threshold for data transmission over a predefined period in the past. According to one aspect the estimation of an expected performance is further based on the activity of the already connected wireless devices. This might also serve the purpose to give a more accurate estimate of what performance actually will be obtained.

When the performance measure is transmission delay, it might also be desirable to take into account that not all wireless devices have full buffer traffic. Specifically, with a large number of wireless devices that have a bursty traffic, the variation in transmission delay might vary significantly although the average throughput might be acceptable. This drawback with too many wireless devices might also be captured by including the number of already connected devices (NumberOfSTAs parameter) as described below.

The relation between the performance and the number of attached or connected devices may be estimated in several ways. One way to get the relation is to make simulations like the ones disclosed in FIGS. 3a-3d. An easy way is to make a general assumption. According to one aspect performance is assumed to decrease linearly compared to the ideal case, as a function of the total number of wireless devices connected to the wireless network node.

However, the number of connected devices does generally not affect the performance, until a certain number of wireless devices are attached or connected. As shown in FIGS. 3a-3d, the number of connected devices affects the performance first when a certain number of wireless devices are connected to the wireless network node. Hence, according to one aspect the decrease is assumed to be zero up to a predefined number of connected devices. Another possibility is to let the decrease be zero up to a predefined channel load of the wireless devices already connected to the wireless network node network node.

Channel load is not only relevant to performance, when considering the number of connected devices. The load affects the performance in several ways. According to one aspect, shown in FIG. 5, the estimation of an expected performance is further based on present channel load S2c. Channel load includes load created not only by other wireless devices attached to the wireless network node. Channel load includes all of the following:

- Load created by Wi-Fi devices belonging to the population of the particular wireless network node, i.e. wireless devices attached to the wireless network node.
- Load created by Wi-Fi devices not belonging to the population of the particular wireless network node (neighboring wireless network nodes and/or wireless devices);
- Non-Wi-Fi packet-based wireless technologies operating on the same frequency (e.g. operating according to the IEEE 802.15.4 standard);
- Non-Wi-Fi devices of non-packet-based wireless technologies operating on the same frequency (e.g. wireless phones).

Another relevant parameter which may be taken into account is the RSSI or Received Channel Power Indicator (RCPI) for that particular wireless device as described in prior art. The RSSI can then be used in combination with e.g. the number of connected devices or channel load, to give an improved estimation.

Other parameters that may be taken into account is the capabilities of the wireless device, capabilities of the wireless network node and the current configuration of the wireless network node.

The above parameters used to estimate the performance are generally available at the wireless network node. This is in contrast to when there is a desire to estimate the performance at one of the connected wireless devices, in which case the details of the other connections are not always known.

According to one aspect the step of determining admission of the further wireless device is further based on required performance or priority requirement of the further wireless device. The required performance is e.g. a required bit rate or a maximum delay.

For wireless network nodes supporting newer versions of the standard, e.g. IEEE 802.11e, there might also be a possibility to give different priorities to different services, like background traffic, best effort, video, and voice. When this is the situation, the above ideas can be generalized as follows. To determine if a specific wireless device or STA should be allowed to connect to the wireless network node, it is also taken into account what priority is requested. As one example, suppose that currently there is a large number of wireless devices connected to the wireless network node, say 50, but that the total offered traffic is only half of the capacity of the wireless network node. If a wireless device, which wants best effort traffic of rather high average data rate, wants to connect, that may be suitable as there is a lot of capacity but the fluctuations in delay might vary considerable because of the large number of connected wireless devices. On the other hand, if a wireless device with high requirement on priority (low transmission delay) wants to connect, this might not be suitable even if the average data rate needed to be supported might be small. Hence, not only the required bit rate is considered, but also the requested priority of the service or application of the wireless device. Again the different priorities among wireless devices connected to a wireless network node are known at the wireless network node, but in case the estimation would be done at the UE, this information will probably be missing.

Figure 6:
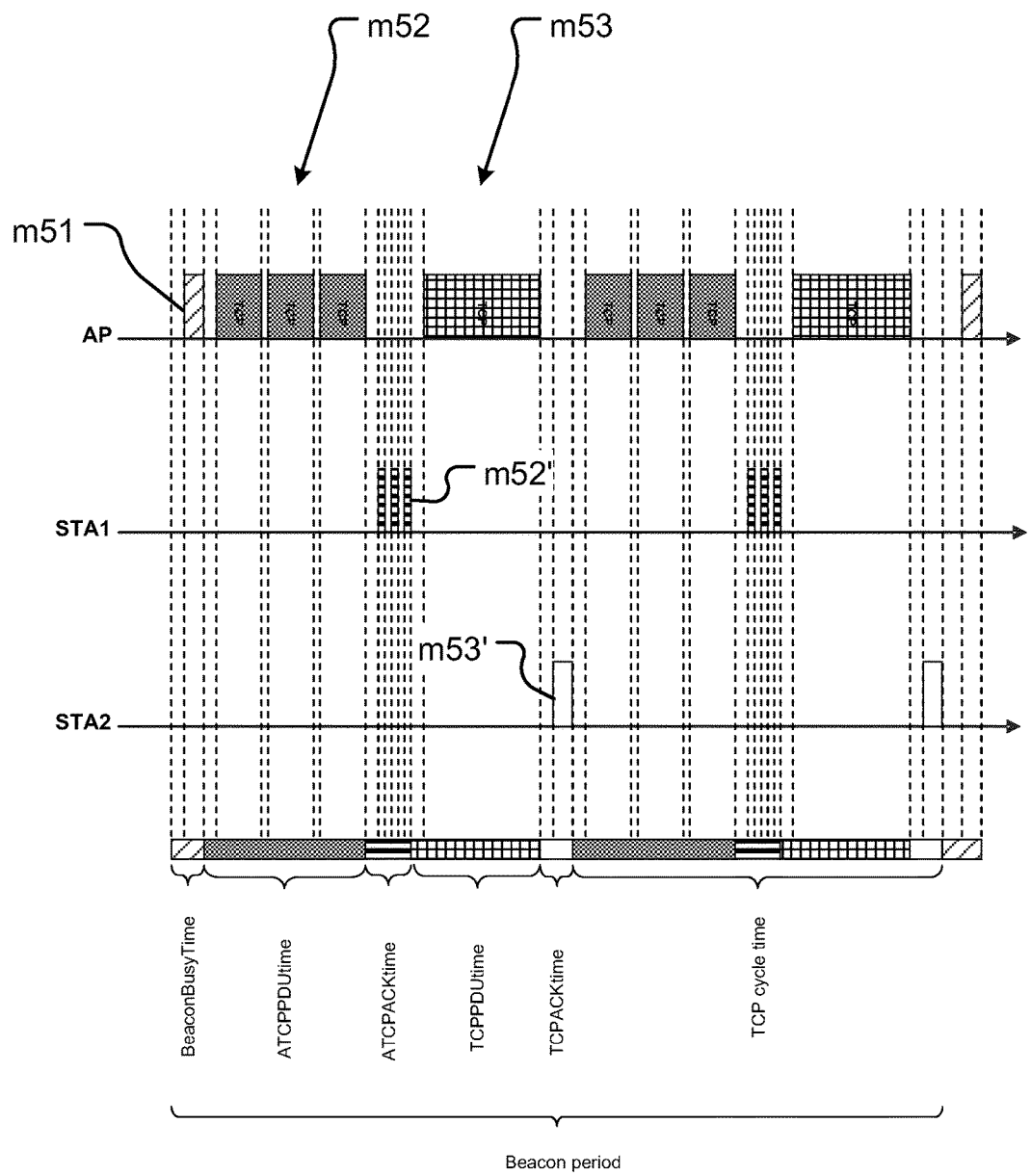
FIG. 6 shows a Wi-Fi cell load model representing multiple users with frame aggregation.

Turning now to FIG. 6, an example of the method implemented by a wireless network node will now be given. In the following example, the bit rate estimation algorithm considers two wireless devices STA1 and STA2 in a Wi-Fi system, a clean radio channel (no interference from devices operating on the same frequency), a full buffer for the wireless device (the wireless network node's queue for that wireless device is always full and the wireless network node is therefore always looking for an opportunity to send data to that wireless device) and that the bit rate estimation is based only on the signal-to-noise ratio, SNR, between the wireless network node and the wireless devices. This example further considers IEEE 802.11 frame aggregation. Frame aggregation is a feature that increases throughput by enabling sending two or more data frames in a single transmission. The cell load model for this scenario is depicted in FIG. 6 showing a Beacon period comprising two TCP cycles, for the wireless network node, AP, represented by the upper arrow and two wireless devices, STA1 and STA2, represented by the two lower arrows. In FIG. 6, the patterned fields illustrate transmissions from the different devices.

FIG. 6 is disclosing a beacon m51 transmitted by the AP followed by three TCP transmissions m52 and from the wireless network node to STA1. Each transmission is followed by a acknowledge (TCP-ACK) m52' transmitted by STA1. These three TCP transmissions and TCP-ACK transmissions are transmitted by one single Aggregation MAC Protocol Data Unit (A-MPDU). The transmissions to STA 1 is followed by a transmission from the AP to STA2 m53 and an acknowledge m53' from STA2. Hence, when looking at the picture there is only one of the parts AP, STA1 and STA2 transmitting at the same time.

The expected bit rate, which a further STA can obtain upon connecting to the wireless network node under what we refer to as ideal conditions (see S1 in FIG. 4), is then calculated by according to:

$$ExpectedBitrate = \frac{TCPPacketSize * NumberOfTCPCycles}{BeaconPeriodTime * NumberOfTCPPDUPerATCPPDU},$$

as defined above.

The TCPPacketSize is given by the Ethernet version 2 specification, which sets the Maximum Transfer Unit (MTU) size to 1500 octets or bytes. Furthermore, a TCP header has a size of 40 octets, then:

TCPPacketSize=1500 bytes−40 bytes=1460 bytes

The NumberOfTCPCycles is the number of TCP cycles i.e. the number of (A)-MPDU, containing one or several TCP packets and the corresponding (A)-MPDU containing the corresponding TCP ack for the TCP packets, each device can transmit during a beacon period. Given that all devices have full buffer traffic on downlink direction (i.e. from AP to STA), and the number of (A)-MPDU is equally distributed among the devices. The NumberOfTCPCycles is e.g. affected by the load or the coding scheme.

NumberOfTCPCycles can be derived by dividing the total available time per beacon period, which is derived by removing the time the access point is busy transmitting the beacon, BeaconBusyTime and used for noisy environment compensation and for non 802.11 device compensation, RXBusyTime, from the BeaconPeriod, with the total TCP cycle time for PDU transmissions and acknowledges corresponding to the devices, STA1 and STA2, already connected to the wireless network node. which is defined by A+B. RXBusyTime is the time where 802.11 transmission is not possible as the noise floor is above a certain threshold, caused by interference from other non 802.11 devices.

NumberOfTCPCycles is then given by:

$$NumberOfTCPCycles = \frac{BeaconPeriodTime - BeaconBusyTime - RXBusyTime}{A + B},$$

where A is the total requested transmission/acknowledge time per TCP cycle for all wireless devices (STA) attached to the wireless network node that do not support frame aggregation and is given by:

$$A = \sum_{AllNon-FASTA} (TCPPDUTime + TCPACKTime).$$

Where the summation is made for all stations that do not support frame aggregation (AllNon-FA STA), TCPPDUTime is the TCP Packet Data Unit Time and TCPACKTime is the TCP Acknowledge time, as illustrated in FIG. 6. Hence, it has been assumed that each TCP packet is acknowledged individually, which is only an assumption.

B, on the other hand, is the estimated transmission/acknowledge time per TCP cycle for all associated to the wireless network node wireless devices (STA) that do support frame aggregation and is given by:

$$B = \sum_{\text{All FASTA}} [(ATCPPDUTime + ATCPACKTime)]$$

Where the summation is made for all stations that support frame aggregation (All-FA STA), ATCPPDUTime is the aggregated TCP Packet Data Unit Time and ATCPACKTime is the TCP Acknowledge time for aggregated frames, as illustrated in FIG. 6.

Furthermore,

BeaconPeriodTime=BeaconPeriod*TU,

Where BeaconPeriod and TU are typically defined in the specification of the standard e.g. in 802.11:

BeaconPeriod=100TU, which is the de facto default value, even though it is a subject to configuration. The TU, or Time Unit used for defining the beacon period, in 802.11 is:

TU=1024 µs

Furthermore the PDU times and ACK times are all dependent on the used Modulation and Coding Scheme, MCS and the TCP packet size:

TCPPDUTime=$f_1$(MCS),

TCPACKTime=$f_2$(MCS),

ATCPPDUTime=$f_3$(MCS,TCPPacketSize),

ATCPACKTime=$f_4$(MCS,TCPPacketSize)

and

NumberOfTCPPDUperATCPPDU=$f_5$(MCS,TCP-PacketSize).

The functions $f_1$, $f_2$, $f_3$ and $f_4$ represent the relation between the Modulation and Coding Scheme, MCS, and the respective time intervals, while the function $f_5$ represents the relation between the number of TCP PDUs per one aggregated TCP PDU (A-TCP PDU which is called A-MPDU in 802.11 terminology). The Modulation and Coding Scheme can be determined by:

MCS=$f_6$(SNR$_{AP-STA}$), where the function $f_6$ is vendor-specific. SNR$_{AP-STA}$ denotes the signal-to-noise ratio between an wireless network node and a wireless device, trying to connect to that wireless network node, and is available at both the wireless network node and the wireless device. If an assumption is made that the channel is reciprocal, the SNR$_{AP-STA}$ has the same value in both the wireless network node and the wireless device.

In this example, the expected bit rate is estimated under idealized conditions which allows for an explicit expression.

Then, as stated above in relation to S2 of FIG. 4, there are other features that might be needed to consider in order to obtain an accurate estimate of the expected performance of a possible future connection between the wireless network node and the further wireless device. Here follows an example of how such estimation may be done.

First, when more than one device is associated with the wireless network node, there is a certain risk for collision. When two transmissions collide, one or both packets are lost depending on the relative strength of the two signals. As the number of attached wireless devices becomes large, say 20, the probability for a collision cannot be neglected. A collision impacts the expected data rate negatively in two ways. First, because of the collisions the data packet needs to be retransmitted. Second, because of the collisions, the random back-off, i.e. the time between a transmission attempt and retransmission, is increased as part of the CSMA/CA algorithms. The increase in back-off means that the expected time between two packets will increase and thus also reduces the average throughput.

The second feature to consider is that not all wireless devices have full-buffer traffic, i.e., the traffic from at least some of the wireless devices show a more bursty nature, i.e., some wireless devices do only try to get access to the channel on an irregular basis. In addition, not all wireless devices do typically have the same requirements in terms of requested bit rate.

To take into the effect of collisions between wireless devices, the above formulas for the estimated data rate is modified as follows ExpectedBitrate_with_collisions=$f_7$(ExpectedBitrate, NumberOfSTAs)

Here the ExpectedBitrate is the expected bit rate as determined in the previous embodiments and NumberOfSTAs is a number indicative of the number of wireless devices connected to the wireless network node. NumberOfSTAs might for instance be the number of wireless devices connected to the wireless network node, but it could also be a more coarse parameter representing the number of connected devices being "1" if the number of wireless devices is less than 5 and "0" if the number of connected wireless devices is 5 or more. Another alternative would be that NumberOfSTAs is "1" if the number of STA is greater than a certain value e.g. 5, for the "damage" caused by collisions and "0" (no effect of collisions on the throughput) if the STA number is relatively low e.g. <5.

The purpose of the parameter NumberOfSTAs is to properly adjust the expected bit rate such that it is typically reduced as the number of wireless devices increases. An example of such a function is given by:

ExpectedBitrate_with_collisions=ExpectedBitrate*(1−NumberOfSTAs/50)

In this very simple formula it is expected that every added wireless device reduces the expected bit rate by 2% compared to the ideal case so that when there are 50 wireless devices connected the expected bit rate is zero. Although simplified, the idea that it might be a poor idea to have too many wireless devices connected to the wireless network node is clearly reflected and thus any algorithm used to determine whether to add yet another wireless device will also take the effect of increased probability for collision into account. Another example of a function which would have these properties is:

ExpectedBitrate_with_collisions=ExpectedBitrate if NumberOfSTAs≤10 and

ExpectedBitrate_with_collisions=0, otherwise.

This means that for NumberOfSTAs≤10, the impact of collisions is neglected, but for NumberOfSTAs>10, the collisions are so bad that the performance is zero. Effectively this latter algorithm will results in that a wireless network node always will keep NumberOfSTAs≤10.

Figure 7:
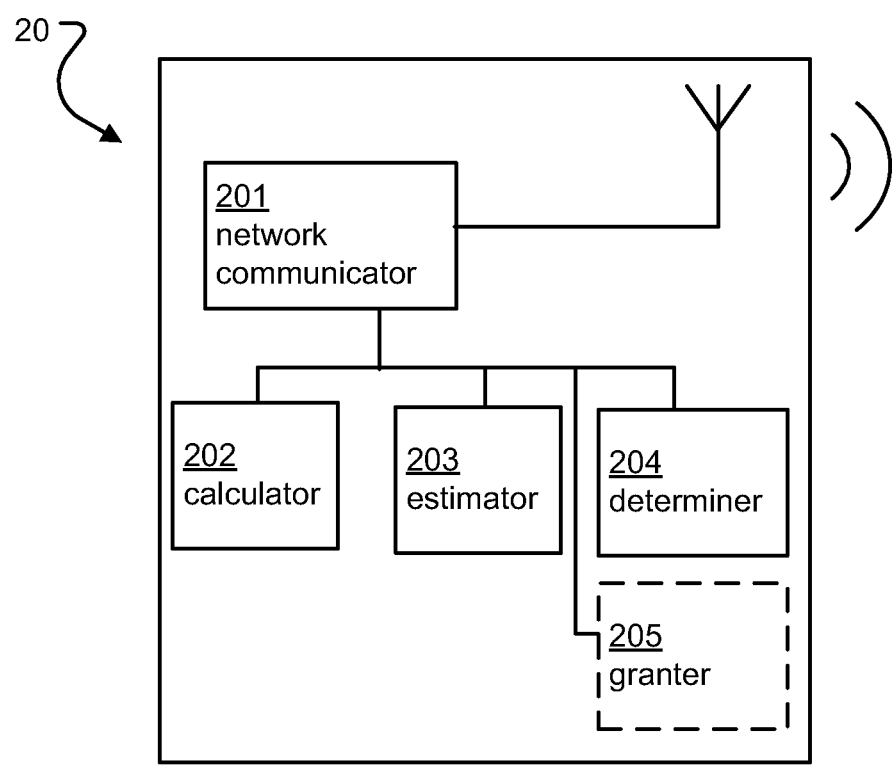
FIG. 7 illustrates a wireless network node in a block diagram.

Turning now to FIG. 7, a schematic diagram illustrating some modules of an exemplary embodiment of a wireless network node 20 will be described. According to one aspect, the wireless network node 20 is be implemented as an access point (AP) in a Local area network. For example the wireless network node is a WLAN hotspot.

The wireless network node 20 comprises a network communicator 201, a calculator 202, an estimator 203, a determiner 204 and a granter 205.

The network communicator 201 is configured to communicate with a number of wireless devices, such as the wireless devices 30 in FIGS. 1 and 2.

The calculator 202 is configured to calculate a measure of the performance of a possible future connection between the wireless network node and a further wireless device under ideal network conditions, as described above.

The estimator 203 is configured to estimate an expected performance of a possible future connection between the wireless network node and the further wireless device, as the calculated measure of the performance while taking into account effects of the used access method as described above.

The determiner 204 is configured to determine of admission of the further wireless device based on the estimated expected performance.

The granter 205 is configured to grant admission to the further wireless device to connect to the wireless network node.

The wireless network node further comprises modules configured to execute all the aspects of the method performed in a network node described above.

According to one aspect the disclosure relates to a computer program, comprising computer readable code which, when run on a wireless network node in a cellular communication system, causes the node to perform the method as described above. The modules are then software blocks or modules of the computer program. The network node then further comprises a controller capable of executing computer program. The computer program is stored in a memory.

The modules may as an alternative, be implemented completely or partly in hardware using any conventional technology, such as discrete circuit or integrated circuit technology, including both general-purpose electronic circuitry and application-specific circuitry. The memory and the processor are then replaced by corresponding hardware blocks.

Although aspect and examples of the proposed technique have been illustrated in the accompanying drawings and described in the description, it will be understood that the methods and apparatuses are not limited to the embodiments disclosed herein. In particular, the proposed technique is capable of numerous rearrangements, modifications and substitutions without departing from the scope of the disclosure as set forth and defined by the following claims.

The invention claimed is:

1. A method implemented by a wireless network node, to which a number of wireless devices are already connected and are communicating using an access method, of determining admission of a further wireless device, the method comprising:
calculating a measure of the performance of a possible future connection between the wireless network node and the further wireless device under ideal network conditions, wherein ideal network conditions refer to that the available data rate is divided between the already connected devices and the further wireless device, without any interference or collisions between the already connected devices and the further wireless device;
estimating an expected performance of the possible future connection between the wireless network node and the further wireless device as the calculated measure of the performance while taking into account effects of the used access method, wherein the estimation is further based on the number of wireless devices already connected to the wireless network node and on the activity of the already connected wireless devices;
determining admission of the further wireless device based on the estimated expected performance; and
granting admission to connect the further wireless device to the wireless network node.

2. The method according to claim 1 wherein the step of calculating a measure of the performance comprises calculating bit rate, transmission delay, or delay jitter.

3. The method according to claim 1, wherein the estimation of an expected performance is based on estimating one or several of the following measures: time to idle channel, interference and collision rate.

4. The method according claim 1, wherein the expected performance is assumed to decrease linearly compared to the ideal case, as a function of the total number of wireless devices already connected to the wireless network node.

5. The method according to claim 4, wherein the decrease is assumed to be zero up to a predefined number of already connected devices.

6. The method according to claim 1, wherein the estimation of an expected performance is further based on present channel load.

7. The method according to claim 1, wherein the step of determining admission of the further wireless device is further based on required performance or priority requirement of the further wireless device.

8. The method according to claim 1, wherein the wireless network node is an Access Point in a Wireless Local Area Network and where the wireless devices are Stations in the Wireless Local Area Network.

9. The method according to claim 1, wherein step of calculating a measure of the performance of a possible future connection and the step of estimating an expected performance of a possible future connection are executed as a joint operation.

10. The method according to claim 9, wherein the decision to handover to the wireless network is further based on connection characteristics of a connection between the further wireless device and another wireless network to which the further wireless device is already connected.

11. A nontransitory computer readable medium comprising computer readable code which, when run on a wireless network node in a cellular communication system to which a number of wireless devices are already connected and are communicating using an access method, causes the node to perform a method of determining admission of a further wireless device, the method comprising:
calculating a measure of the performance of a possible future connection between the wireless network node and the further wireless device under ideal network conditions, wherein ideal network conditions refer to that the available data rate is divided between the already connected devices and the further wireless device, without any interference or collisions between the already connected devices and the further wireless device;
estimating an expected performance of the possible future connection between the wireless network node and the further wireless device as the calculated measure of the performance while taking into account effects of the used access method, wherein the estimation is further based on the number of wireless devices already connected to the wireless network node and on the activity of the already connected wireless devices;

determining admission of the further wireless device based on the estimated expected performance; and granting admission to connect the further wireless device to the wireless network node.

12. A wireless network node, defining a wireless network, comprising:

a network communicator, configured to communicate with a number of wireless devices;

a calculator configured to calculate a measure of the performance of a possible future connection between the wireless network node and a further wireless device under ideal network conditions, wherein ideal network conditions refer to that the available data rate is divided between the already connected devices and the further wireless device, without any interference or collisions between the already connected devices and the further wireless device;

an estimator configured to estimate an expected performance of the possible future connection between the wireless network node and the further wireless device as the calculated measure of the performance while taking into account effects of the used access method, wherein the estimation is further based on the number of wireless devices already connected to the wireless network node and on the activity of the already connected wireless devices;

a determiner configured to determine on admission of the further wireless device based on the estimated expected performance; and a grantor configured to grant admission to connect the further wireless device to the wireless network node.

* * * * *